March 26, 1940.  V. I. HOOPER ET AL  2,194,501
TANK INSTALLATION
Filed May 11, 1938  7 Sheets-Sheet 2

Inventors
Virgil I. Hooper
Louis G. Hooper

March 26, 1940.  V. I. HOOPER ET AL  2,194,501
TANK INSTALLATION
Filed May 11, 1938  7 Sheets-Sheet 3

Inventors
Virgil I. Hooper
Louis G. Hooper
by Parker & Carter
Attorneys

March 26, 1940.  V. I. HOOPER ET AL  2,194,501
TANK INSTALLATION
Filed May 11, 1938  7 Sheets-Sheet 4

Inventors
Virgil I. Hooper
Louis G. Hooper
by Parker Parker
Attorneys

March 26, 1940.  V. I. HOOPER ET AL  2,194,501
TANK INSTALLATION
Filed May 11, 1938  7 Sheets-Sheet 6

Inventors
Virgil I. Hooper
Louis G. Hooper
by Parker Hartes
Attorneys

Patented Mar. 26, 1940

2,194,501

UNITED STATES PATENT OFFICE 2,194,501

TANK INSTALLATION

Virgil I. Hooper, Gordon, Tex., and Louis G. Hooper, Sarepta, La., assignors to The Bastian-Blessing Company, Chicago, Ill., a corporation of Illinois Application May 11, 1938, Serial No. 207,421

13 Claims. (Cl. 62—1)

Our invention relates to an improvement in means for handling fluids and is particularly adaptable to means for unloading and loading volatile liquids or liquids containing volatile gases. As examples we may indicate propane, butane, gasoline and the like. It will be understood, however, that our invention is applicable to a wide variety of liquids, including those not under pressure and not developing pressures or releasing gases under pressure. For example, fuel oils may be handled by our system.

We illustrate our invention as applied to fixed tank systems and in combination with a movable source of supply, such as a delivery truck tank or the like. A practical application of our invention is to buried tank systems such as are employed for the domestic use of propane, butane or liquids having similar characteristics.

One purpose is the provision of improved removable valve assemblies for loading fixed tanks and for permitting the return of gases from the tank being loaded to the tank from which the load comes.

Another purpose is the provision of improved means for preventing tampering with the contents of a fixed tank and for preventing "bootlegging" or access to the tank for filling purposes or otherwise of unauthorized operators.

Another purpose is the provision of an improved valve fitting combination for use with such tanks, which is employed in connection with a single passage member extending from such a tank.

Other purposes will appear from time to time in the course of the specification and claims.

We illustrate our invention more or less diagrammatically in the accompanying drawings wherein.

Like parts are indicated by like symbols throughout the specification and drawings.

Figure 1:
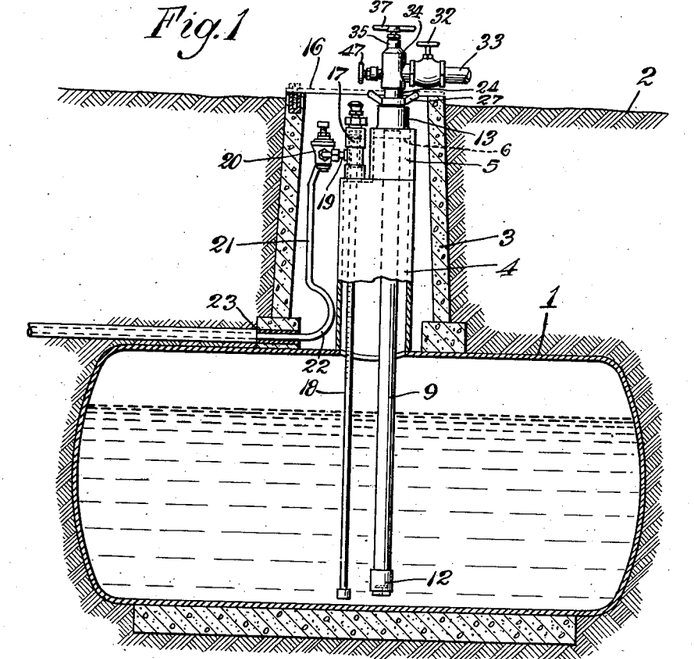
Figure 1 illustrates in vertical section a buried tank with our removable valve assembly in position.

Referring first to Figure 1, 1 indicates a buried tank of the type which may be employed for butane, propane or the like. It is herein shown as buried a substantial distance in the earth, indicated at 2. 3 is a tank assembly well whereby the tank is put in communication with the surface. Upwardly extending from the tank is a single passage 4 having an upward extension 5 closed by any suitable fixed fitting 6 provided with a central aperture 7. The aperture is downwardly enlarged as at 8 and screw-threaded to receive the upper end of an eduction pipe 9. It is also screw-threaded at its upper end as at 10 to receive the closure plug 11. 12 indicates any suitable valve at the bottom of the eduction pipe 9. It is effective to prevent undesired escape of liquid from the tank 1 in the event that the valve assembly below described becomes broken off or is improperly opened.

Figure 3:
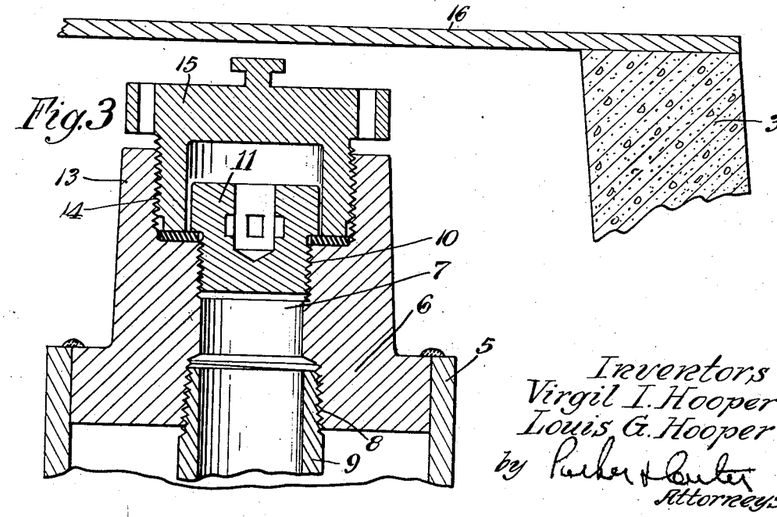
Figure 3 is a vertical section on an enlarged scale illustrating the tank in closed condition.

The member 6 is provided with an upper flange 13 inwardly screw-threaded as at 14 to receive the corresponding screw threads of the closure cap 15. It will be understood that when the parts are in the position in which they are shown in Figure 3, any suitable cover plate, indicated in full line in Figure 3 and in dotted line in Figure 1 as at 16, may be positioned at the top of the well 3 whereby outside access to the tank and its outlet is prevented. 17 indicates a fitting upwardly extending from the member 4 at one side of the passage 5. Mounted in it in any suitable manner is a slip tube gauge 18 the details of which do not of themselves form part of the present invention. 19 indicates a service gas outlet to the regulator 20. The passage is continued as at 21 with the bend 22 and may extend outwardly through the well as at 23 to any suitable point of use such as a dwelling house or the like.

Figures 2, 4, 5, 7:
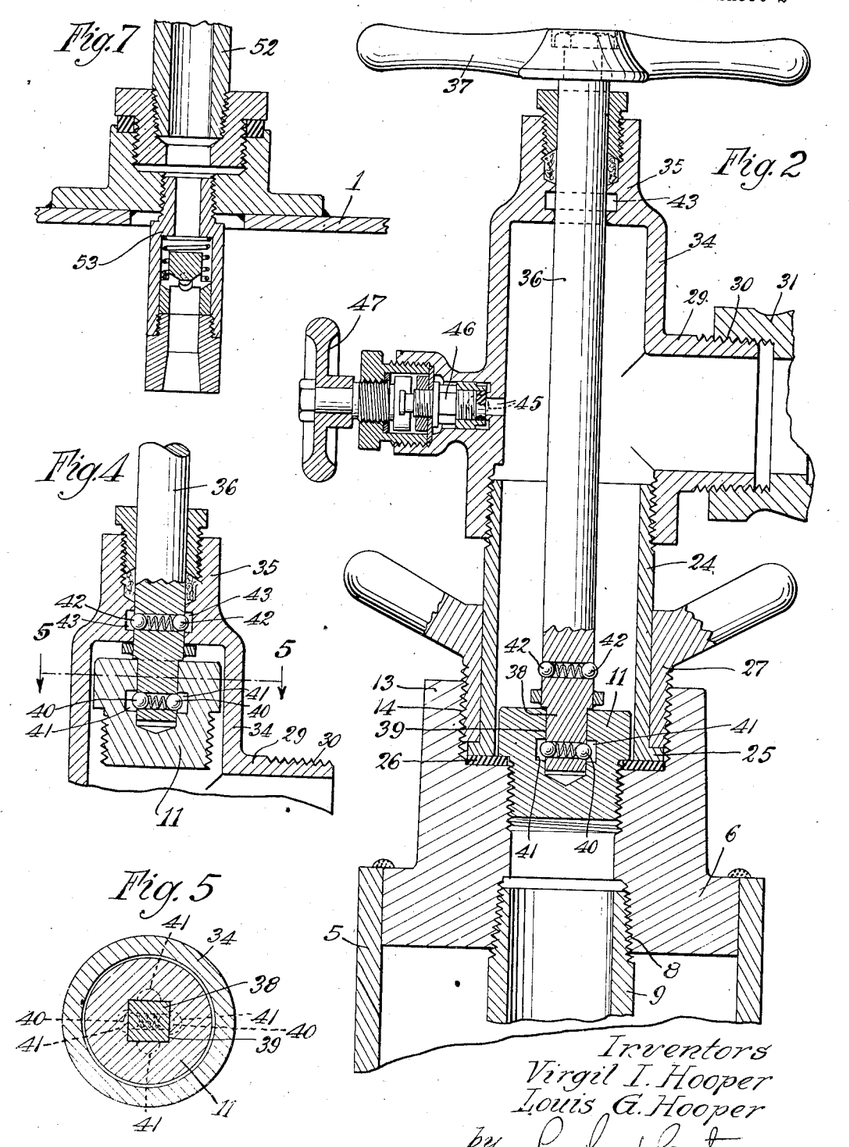
Figure 2 is an enlarged section through the loading aperture of Figure 1, illustrating the device with our removable loading valve assembly in position.
Figure 4 is a partial view of the structure shown in Figure 2, illustrating the tank closure in open position.
Figure 5 is a section on the line 5—5 of Figure 4.
Figure 7 is a section on an enlarged scale on the line 7—7 of Figure 6.

Assuming that the tank is somewhere near empty and that it is the wish of the operator to fill it, the cover plate 16 is removed and the loading valve assembly generally indicated in Figure 2 may be applied. The valve passage member 24 has a bottom ledge 25 which is adapted to engage the gasket 26 when the closure 15 is removed. Its central aperture is somewhat greater than the exterior diameter of the plug 11 so that it can be put in place or removed without disturbing the said plug. It may be locked in position by the wing nut 27, the threads of which engage the threads 14 of the flange 13.

Figure 11:
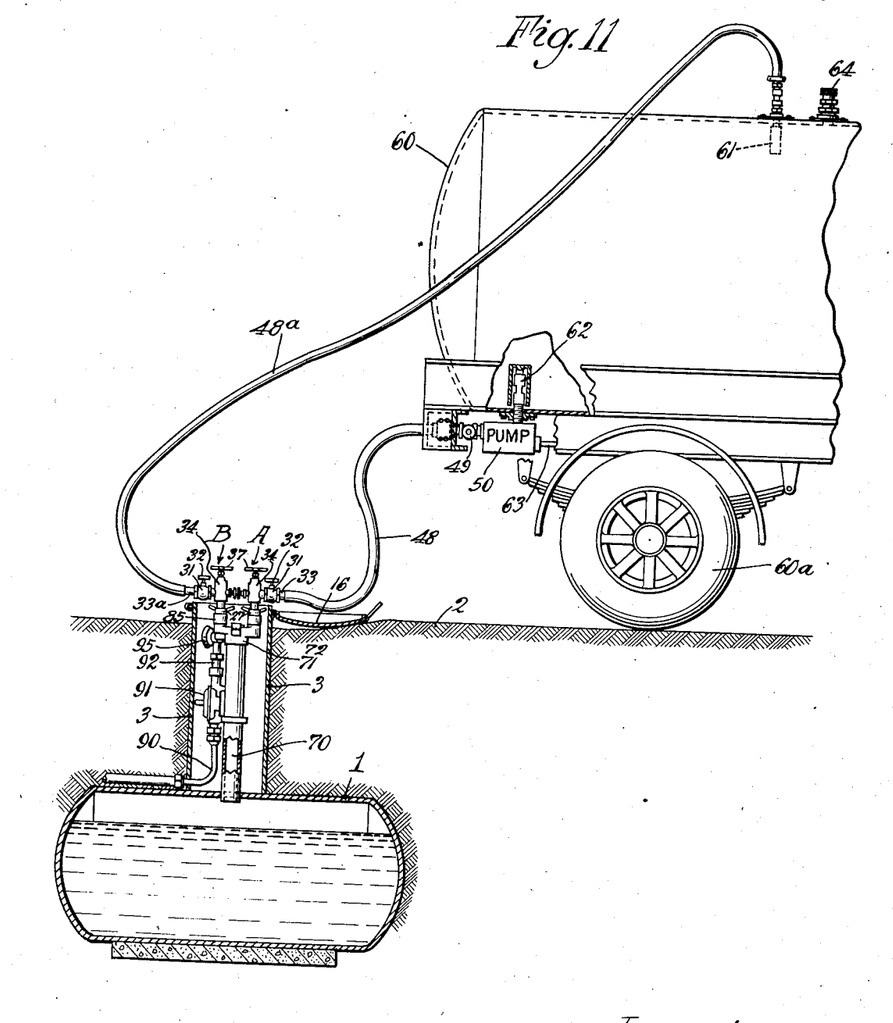
Figure 11 is a vertical section through a variant form of tank, illustrating the complete system with the delivery tank truck in loading relationship with the tank.

In communication with the upper end of the member 24 is a T having a side branch 29 screw-threaded as at 30 to receive the valve housing 13 in which is any suitable valve controlled by the exterior handle 32. 33 is any suitable passage to which may be secured a loading hose or line extending to a suitable source of supply. It will be understood in connection with Figure 1 that a truck such as is shown in Figure 11 and later described in detail may be employed.

The upper branch 34 of the T is alined with the passage member 24 and is of generally the same diameter. Slidable and rotatable in its end portion 35 is a stem 36 controlled by an exterior handle 37 provided with a squared portion 38 adapted to penetrate the correspondingly formed aperture 39 in the closure plug 11. Spring balls 40 may engage apertures 41 in the plug whereby when the plug has been unscrewed by rotation of the handle 37 it may be upwardly withdrawn into the position in which it is shown in Figure 4. When withdrawn to the upper position by a sliding movement of the stem 36 in the end 35, the upper balls 42 engage locking apertures 43 in the end member 35, as shown in Figure 4. The closure plug 11 is then held out of line of the flow between the tank and the valve housing 31.

When the operator is loading the tank and has applied the above described valve assembly, he can open the valve controlled by the handle 32 and permit the liquid to flow from the tank truck or other source of supply into the tank 1. When the tank is filled, the operator then moves the closure plug into closing position and rotates it until it is tightly drawn downwardly against the gasket 26. He preferably then closes the valve in the housing 31 and before removing the valve assembly he vents its interior to draw off any pressure that may be therein.

This venting may be performed through the venting aperture 45 controlled by any suitable valve structure generally indicated as 46 and controlled by an exterior handle 47. After he has vented the interior of the loading valve assembly, he can then disconnect it from the flexible filling tube and from the flange 13. Incidentally, the venting enables the operator to know whether or not the plug 11 is screwed tightly in place, as if there is any escape about the plug 11 it will cause a continuing flow outwardly through the vent passage 45 which is easily observable.

When the valve fitting is removed, the operator returns the closure 15 to the position in which it is shown in Figure 3 and closes the closure plate 16. Preferably, in order to prevent venting of inflammable gases to the atmosphere near the dwelling house, the operator will not disconnect the above described valve assembly from the hose connecting it to the truck until he has left the premises. Or, if the desires, he can leave the valve assembly at all times secured to the end of the flexible hose. It will be understood, of course, that any additional valve means which may be necessary may be employed in connection with the flexible hose.

Referring to Figure 11, we indicate a hose 48 with a valve 49 separating it from any suitable pump structure 50. Thus in effect the hose 48 is provided with a valve at each end, since the valve 20 controlled by the handle 32 closes the opposite end of the hose.

Figure 6:
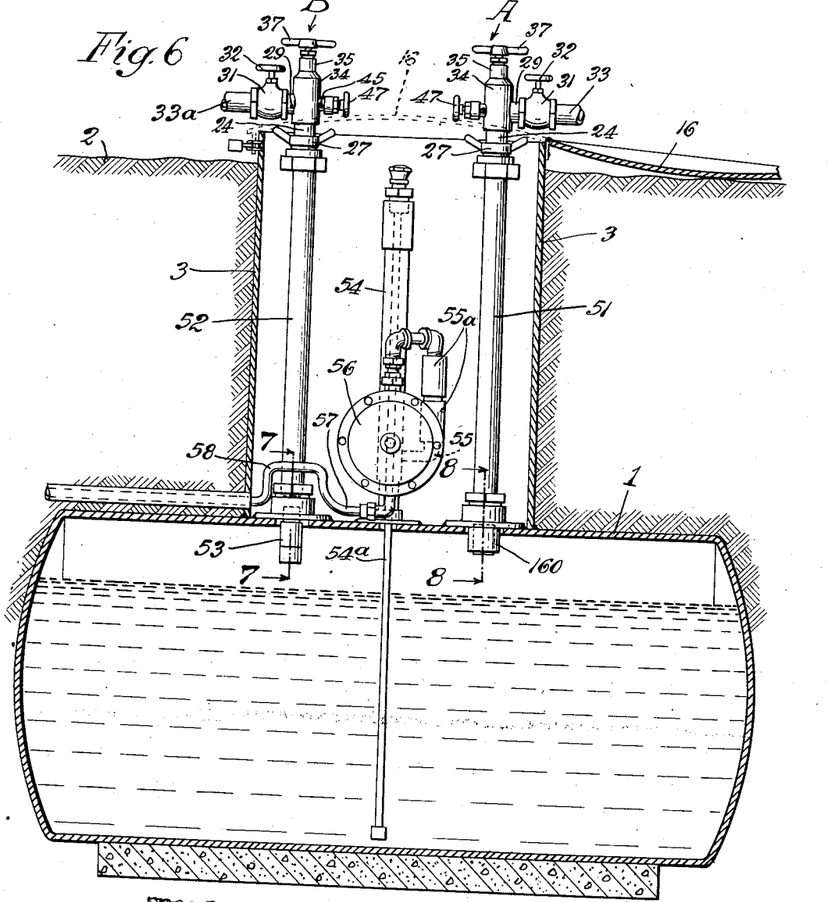
Figure 6 is a vertical section through a variant structure in which two of our valve assemblies are employed, one for loading and one for vapor return.
Figure 8:
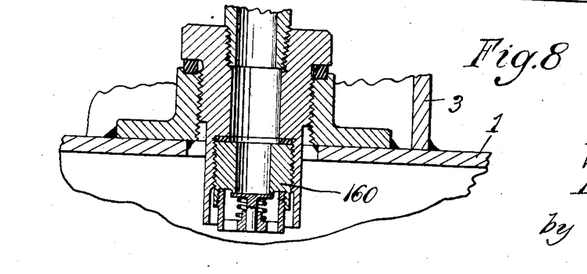
Figure 8 is a section on an enlarged scale taken along the line 8—8 of Figure 6.

Referring to Figure 6, we illustrate a variant installation in which the tank 1 is provided with a pair of upwardly extending passages 51, 52 of which one may be employed as the loading passage and the other as the return vapor passage. In the present instance, 51 is indicated as the loading passage. It is closed at its bottom by any suitable check valve 160 shown in some detail in Figure 8. The bottom of the vapor return passage 52 may be similarly closed by an excess vapor valve 53 generally indicated in Figure 7. As these valves do not of themselves form part of the present invention, they are not described in detail.

At the top of each of the members 51 and 52 we illustrate one of the above described valve assemblies. These may be identical and therefore need not be re-described. It will be understood, however, that to the loading valve assembly indicated at A in Figure 6 any suitable passage may be secured, as indicated at 33. Similarly, to the vapor return valve assembly indicated at B in Figure 6, any suitable vapor return line 33a may be secured, to which in turn may be secured a flexible vapor return tube such as is shown at 48a in Figure 11.

In connection with the tank 1 of Figure 6, we illustrate a unitary gauging and supply passage indicated at 54. It may for example be employed with a slip tube gauge 54a. In communication with the interior of the passage 54 is the service gas outlet line 55 which passes through any suitable excess flow valve or valves 55a and thence to a regulator 56. From the regulator flows the service line 57 with its bend 58 which may extend outwardly through the well 3 to any suitable point of use. It will be understood that when the installation of Figure 6 is employed, the tank generally indicated as 60 in Figure 11, and which is shown as mounted on truck wheels 60a, is connected to the installation in such fashion that the pump 50 pumps liquid from the tank 60 through the line 48 into the loading valve assembly A and thence into the interior of the tank. Meanwhile, any excess pressure of gas forming in the tank above the liquid will flow off through the valve 53 to the passage 52, the valve assembly B and the return hose 48a to the top of the tank 60.

A vapor check valve may be employed in connection with the tank 60 as shown at 61 and an excess flow valve 62 in connection with the liquid line from the interior of the tank 60 to the pump. Thus no unintended escape of liquid or gas can take place from the tank. It will be understood that any suitable means may be employed to drive the pump and it may for example be driven as by a drive shaft 63 from the motor or engine of the truck. The truck may be provided with any suitable fittings, such as the safety valve indicated as at 64. It will be understood that in describing the tank truck as shown in Figure 11, the same tank truck structure should be read in to the form of Figures 1 and 6. When it is used in connection with the form of Figure 1, the vapor return line 48a is not used. Otherwise, the operation is the same.

Figures 12, 13, 14:
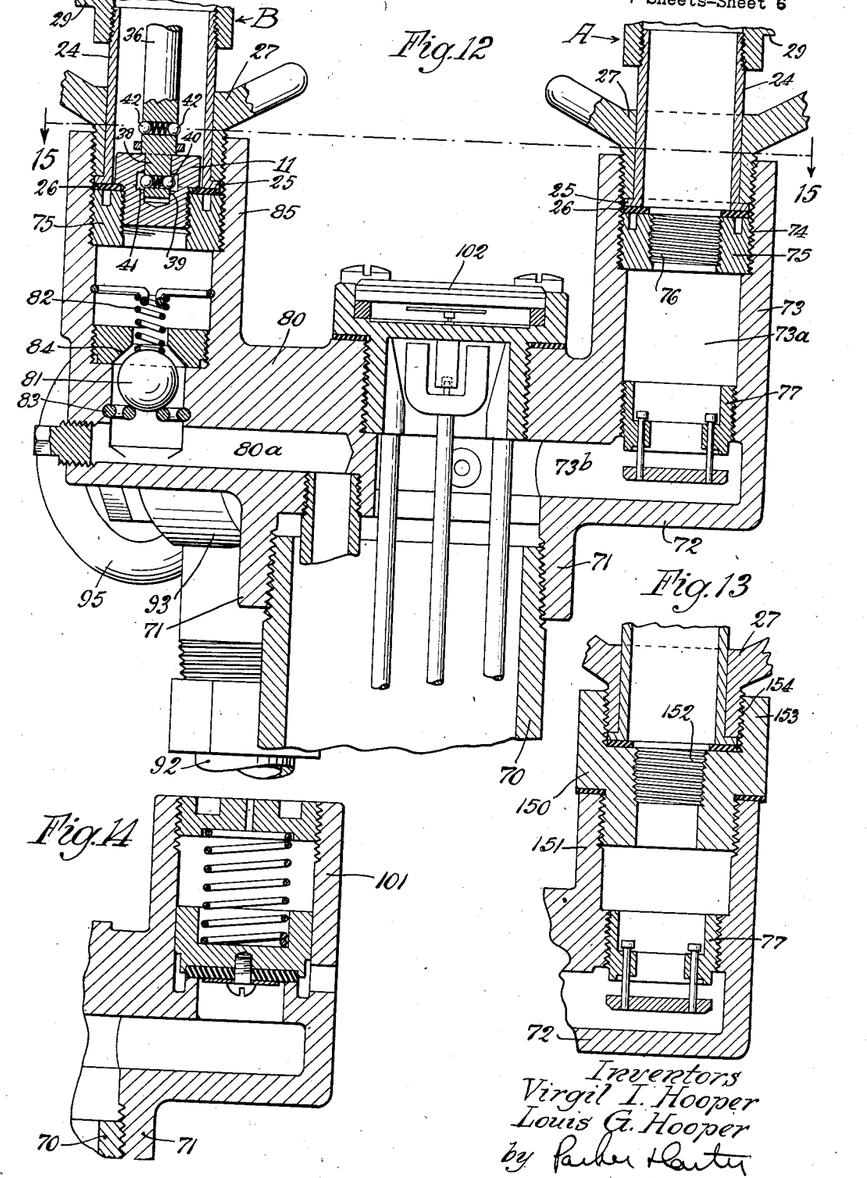
Figure 12 is a vertical section on an enlarged scale through part of the structure shown in Figure 11.
Figure 13 is a partial section similar to Figure 12, illustrating a modification.
Figure 14 is a section on the line 14—14 of Figure 15.

Referring more particularly to the tank installations as shown in Figure 11, and as shown in greater detail in the following figures, we illustrate a single passage member 70 extending upwardly from the tank within the well 3. Located at the top of this passage which is shown in the form of a pipe or cylinder is a unitary head structure which may be a casting and which includes a bottom flange 71 screw-threaded to the top of the passage member 70. Extending outwardly from the flange 71, as will be shown in Figure 15, we illustrate five separate lateral extensions or passages. Of these, 72 terminates in an upward unitary nipple 73 inwardly screw-threaded as at 74 and provided with the ring 75 which is outwardly screw-threaded on the threads 74 and is inwardly screw-threaded as at 76 in order to receive one of the closure plugs 11. In Figure 12 it is shown with the closure plug 11 removed and with a valve assembly applied in place, which may be identical with the details of the assembly shown in Figure 3. 77 indicates an excess flow valve assembly screw-threaded into the bottom of the passage 73a of the member 73.

When loading, the liquid flows downwardly through the passage member 24 through the aperture in the ring 75 through the excess pressure valve 77 and through the passage 73b to the interior of the passage member 70. If the valve assembly above described is broken or is unintentionally removed or is improperly manipulated so that there is an escape of gas or liquid from the interior of the tank, this escape will promptly shut the excess flow valve 77 and prevent unintended escape of gas or liquid from the tank 1.

The passage member 80 extending outwardly from the member 71 and forming part of the above described head or unit, has an interior passage 80a which communicates with the excess vapor valve 81, the ball of which is downwardly urged normally by the spring 82 against any suitable holding clip 83. It will be understood that an excess flow of vapor from the tank will close the ball 81 against the opposed tapered surface 84, while a normal flow of vapor will have no effect at all upon the position of the ball.

85 indicates an upper nipple which receives a ring 75 as above described in connection with the nipple 73. The valve assembly including the portions 24 and 27 is shown in position but the plug 11 is shown as closed. The parts may be thus positioned when the vapor return line is not being employed and liquid is being delivered through the loading valve assembly. As in Figure 6, the loading valve assembly is indicated generally at A and the vapor return valve assembly at B.

The service line for the house supply is indicated at 90. It may pass through the wall of the well 3, extending from any suitable regulator 91. Above the regulator 91 is the passage 92 which extends to the valve unit 93 and communicates with the interior of the above described head through the passages 94, 94a. 95 is an exterior valve control handle adapted to control any suitable valve structure generally shown as at 96 whereby the flow of gas to the house may be positively cut off. 97 is the ball of an excess flow valve, the ball being normally held in open position by the spring 98 shown in Figure 16.

Figures 15, 16:
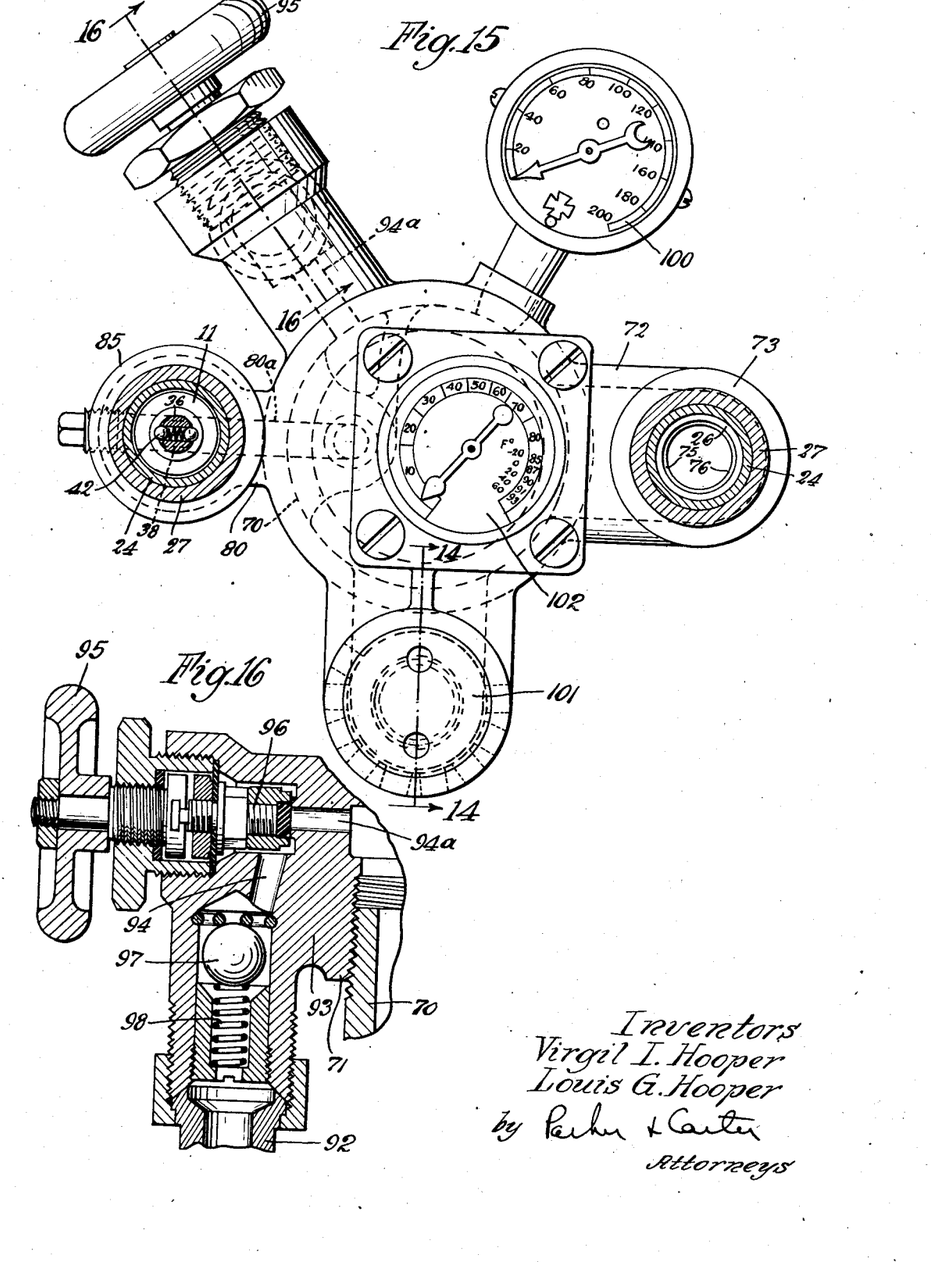
Figure 15 is a section on the line 15—15 of Figure 12.
Figure 16 is a section on the line 16—16 of Figure 15.

As shown in Figure 15, extending outwardly from the head or flange 71 is any suitable pressure gauge generally indicated as 100, the details of which do not form part of the present invention. 101 indicates a relief valve structure illustrated in Figure 14, the details of which do not form part of the present invention, which also extends outwardly from the flange 71.

102 generally indicates any suitable gauge structure which may be of the magnetic type or of any other suitable type and which does not of itself form part of the present invention. It will be understood that all of the mechanisms above described communicate with the interior of the tank, so far as the form of Figure 11 is concerned, through the single passage member 70. The operator thus gauges, loads, draws off return vapor, and relieves excess pressure through a single upward passage or extension of the tank. And from the same extension the supply of gas for use is drawn off to the location where the gas is burned.

In the form of Figure 11, as in the other forms, the operator normally finds the loading and vapor return valve apertures closed by the plugs 11 and the covers 15. The operator when traveling by truck and filling from a truck, has the removable flow and return vapor valve assemblies with him on the truck. He applies one or both as above described and fills the tank while venting such gas back to the truck as may be necessary. Before removing the fittings, he is careful to vent the interior of each fitting through the appropriate vent passage 45, thus checking the tightness of the closure plug 11 and protecting himself from the pressure within the valve assembly. This also makes it unnecessary to vent to the atmosphere near the dwelling the hose between the valve assembly and the truck. If the operator finds it necessary to remove the valve assemblies from the hoses, he can do so at a point remote from the dwelling, or he can simply leave the valve assemblies on the flexible hoses ready for the next job. In any event, there is no need for exhausting or venting to the atmosphere near the dwelling any greater quantity of gas than is contained in the relatively small removable valve assemblies themselves. This amount of gas is insufficient to make any trouble or cause any unfavorable results.

Figures 9, 10:
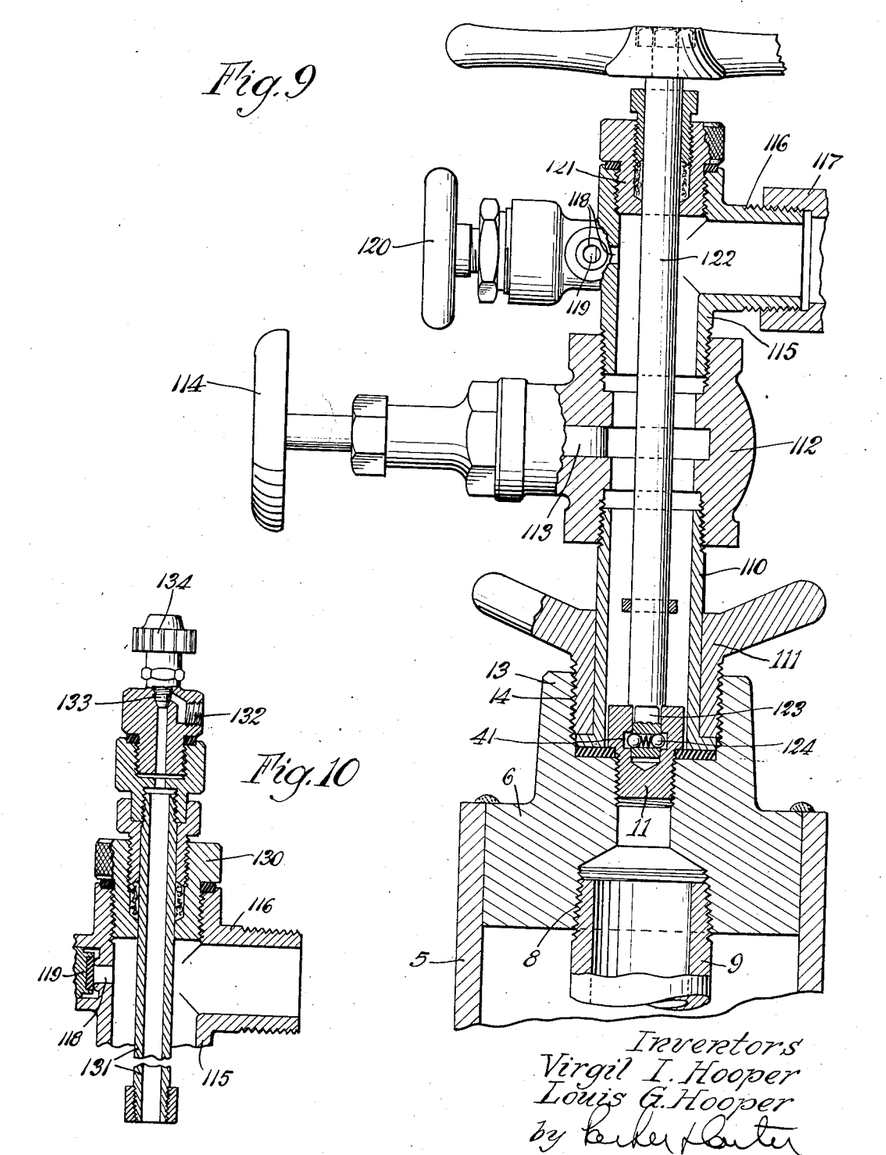
Figure 9 illustrates the application of a variant valve assembly to the tank.
Figure 10 is a detail illustrating the valve assembly of Figure 9 with the gauge structure applied.

Whereas, in all the forms above described we have illustrated gauges applied to the tanks themselves, it will be understood that in the event we wish to gauge a tank which is not so supplied, we may employ the valve assembly shown in Figures 9 and 10 to which a slip tube gauge or the like may be employed. In Figure 9, in place of the valve assembly shown in Figure 2, we illustrate a variant assembly including the passage member 110, wing nut 111, intermediate valve housing 112, valve 113, valve handle 114, and upper passage member 115. The upper passage member has the side passage 116 in communication with the valve housing 117 which is the equivalent of the valve housing 31 of Figure 3. 118 is a vent controlled by any suitable valve structure 119 with an exterior handle 120 corresponding to the vent assembly 45, 46, 47 of Figure 2. In the place of the closed end 35 we illustrate a removable plug 121 in which is slidable and rotatable the pin 122 with the squared end 123 and balls 124 which serves to open and remove the plug 11. When the plug 11 has been removed to a position above the valve 113, the valve 113 can be closed, thus closing off the tank from the atmosphere. The operator can then remove the end 121 with the stem 122 and the closure plug 11 and can replace it with the plug 130 of Figure 10.

Slidably mounted in the plug 130 is the slip tube gauge 131 with its upper outlet 132 controlled by any suitable valve 133 with the exterior control handle 134. In the use of the slip tube gauge as a gauging and sampling device, the operator after he has tightened up the member 130 opens the valve 13 and slips the slip tube gauge down into the interior of the tank. He can then gauge the height of the liquid and sample it if necessary. It will be understood that the valve assembly of Figure 9 may be employed in connection with a loading valve assembly such as is shown in Figure 2. This arrangement is particularly adaptable for use when the valve assembly of Figure 9 is connected with the vapor return line, which in this case may be connected beyond the valve housing 117. This assembly may be used with tanks which are not fitted with excess flow valves or in cases where excess flow valves are employed with means for permitting gauging through them.

For example, in Figure 13 we illustrate a variation of our invention in which a separate fitting 150 may be screw-threaded into a nipple 151 upwardly extending from the extension 72. The fitting 150 is removable and is provided with an interior aperture screw-threaded as at 152 to receive the closure plug 11. It has an upper flange 153 interiorly screw-threaded as at 154 to receive the wing nut 27. It will thus be seen that whereas in Figure 12 we illustrate the removable valve assemblies as applied directly to the members 73 or 85, in the form of Figure 13 removable fittings may be interposed.

It will be realized that whereas we have described and illustrated a practical and operative device, nevertheless many changes may be made in the size, shape, number and disposition of parts without departing from the spirit of our invention. We therefore wish our description and drawings to be taken as in a broad sense illustrative or diagrammatic rather than as limiting us to our precise showing.

In the ordinary operation of our device, it will be understood that the movable tank shown at 60 in Figure 11 may be employed in connection with the forms of our invention shown in Figures 1 and following, and 6 and following, and the said drawings should be interpreted as including such a tank 60 with the associated parts substantially as shown in Figure 11. The loading line 48 may extend from such a tank 60 to the loading valve of the valve assemblies shown in said figures. Under some circumstances, it is necessary to employ a vapor return line. In the form of Figure 1, no provision for such vapor return line 48a is shown, and it is not employed. In the forms of Figures 6 and 11, however, a vapor return line 48a of Figure 11 may be applied to or associated with the outlet 33a of the vapor return unit B.

It will further be understood that the specific details of the units 70, 71, shown in Figures 12 and following, do not of themselves form part of the present invention. What we claim as our invention is the application to this particular unit of the removable valve assemblies herein described, shown and claimed, and of such modifications as are necessary for the adaptation of our valve assemblies to a unit which includes the members 70 and 71 of Figure 12 and the parts associated therewith.

We claim:

1. In combination with a tank having an aperture, a passage fitting for said aperture, a closure for the passage of said fitting, a passage member and means for removably securing it in relation to said fitting while said closure is in closed position, externally operable means for moving said closure with respect to said passage member into open position while said passage member is secured in relation to said fitting, a loading conduit and means for securing it in relation to said passage member, a valve controlling said loading conduit and means for actuating it, additional means for venting the interior of said passage member, an eduction pipe in communication with said aperture and extending downwardly into said tank, and an excess pressure valve member supported by said eduction pipe.

2. In combination with a tank having an aperture, a passage fitting for said aperture, a closure for the passage of said fitting, a passage member and means for removably securing it in relation to said fitting while said closure is in closed position, externally operable means for moving said closure with respect to said passage member into open position while said passage member is secured in relation to said fitting, a loading conduit and means for securing it in relation to said passage member, a valve controlling said loading conduit and means for actuating it, a main service eduction pipe in communication with said aperture and extending substantially downwardly into said tank, an excess pressure valve member supported by said eduction pipe, and a gauging and sampling assembly in communication with the interior of said tank at a point removed from said aperture.

3. In combination with a tank having an aperture, a passage fitting for said aperture, a closure for the passage of said fitting, a passage member and means for removably securing it in relation to said fitting while said closure is in closed position, externally operable means for moving said closure with respect to said passage member into open position while said passage member is secured in relation to said fitting, a loading conduit and means for securing it in relation to said passage member, a valve controlling said loading conduit and means for actuating it, an eduction pipe in communication with said aperture and extending downwardly into said tank, and an excess pressure valve member mounted on said eduction pipe, said tank having an additional aperture and a gauging and sampling assembly removably secured in relation to said additional aperture and including a gauge member adapted to be inserted through said additional aperture into the interior of the tank.

4. In combination with a tank having an aperture in the tank shell, a passage fitting for said aperture, a closure for the passage of said fitting, a passage member and means for removably securing it in relation to said fitting, while said closure is in closed position, externally operable means for moving said closure through said passage member and into open position, while said passage member is held immovable and secured in relation to said fitting, a loading conduit and means for securing it in relation to said passage member, a valve for said loading conduit and means for actuating it, a gauging and sampling assembly, means for removably securing it in relation to said passage member, said assembly including a gauging and sampling member adapted to be downwardly inserted through said passage member and passage fitting into the interior of said tank, an additional closure means in said passage member adapted to close said passage member during the application of said gauging and sampling assembly to or its removal from said passage member.

5. In combination with a tank having an aperture in the tank wall, an access well extending outwardly from the wall of the tank, a nipple outwardly extending from said aperture into said well, a removable closure for the outer end of said nipple, a passage member and means for removably securing it in sealed relation to said nipple and about said aperture, while the closure of the nipple is in closed position, externally operable means for moving said closure through said passage member into open position while said passage member is secured in relation to said fitting, a loading conduit and means for securing it in relation to said passage member, a valve for said loading conduit and means for actuating it, additional means for venting the interior of said passage member, an eduction pipe in communication with said aperture and nipple and extending downwardly into said tank, and an excess pressure valve member associated with said eduction pipe.

6. In combination with a buried tank having an aperture in the tank shell, an access well extending downwardly toward the top of the tank, a nipple extending upwardly from said aperture into said well, a removable closure for the upper end of said nipple, a passage member and means for removably securing it to said nipple while the closure of the nipple is in closed position, externally operable means for moving said closure through said passage member and into open position while said passage member is secured in relation to said fitting, a loading conduit and means for securing it in relation to said passage member, a valve for said loading conduit and means for actuating it, an eduction pipe in communication with said aperture and nipple and extending downwardly into said tank, and an excess pressure valve member associated with said eduction pipe.

7. In combination with a tank having an inlet, a closure for said inlet, a passage member and means for removably securing it in sealed relation about said inlet while said closure is in closed position, externally operable means for moving said closure through said passage member and into open position while said passage member is held immovable and secured in relation to said inlet, a loading conduit and means for securing it in relation to said passage member, a valve for controlling the passage of liquids or fluids through said conduit, an eduction pipe in communication with said inlet and extending downwardly into said tank, and an excess pressure valve member associated with said eduction pipe.

8. In combination with a tank having an inlet, a closure for said inlet, a passage member and means for removably securing it in sealed relation about said inlet while said closure is in closed position, externally operable means for moving said closure through said passage member and into open position while said passage member is secured in relation to said inlet, a loading conduit and means for securing it in relation to said passage member, and a valve for controlling the passage of liquids or fluids through said conduit, said tank having an additional aperture and a gauging and sampling tube slidably mounted therein separate from said passage member, whereby it may be inserted into and removed from the interior of the tank, and an outlet valve for said gauge tube.

9. In combination with a tank having an inlet, a closure for said inlet, a passage member and means for removably securing it in sealed relation about said inlet while said closure is in closed position, externally operable means for moving said closure through said passage member and into open position while said passage member is secured in relation to said inlet, a loading conduit and means for securing it in relation to said passage member, and a valve for controlling the passage of liquids or fluids through said conduit, said tank having an additional passage member communicating therewith, a gauging and sampling tube slidably mounted in said passage member, whereby it may be inserted into and removed from the interior of the tank, and a service outlet for said tank in communication with said passage member.

10. In an installed tank system for volatile liquids, and means for filling it, a normally fixed tank, a single hollow passage unit in communication with the interior of and extending from said tank and having a plurality of apertures, removable closures for said apertures, a removable loading valve assembly, a removable vapor return valve assembly, means for removably securing said assemblies separately in relation to said apertures in said single passage unit while said apertures are closed, means for opening the closures of said apertures after said valve assemblies have been applied and while said valve assemblies remain stationary, a removable supply tank and a truck therefor, a loading line extending from said tank to the loading valve assembly, a valve intermediate said loading valve assembly and line, a vapor return line extending from said tank to said vapor return valve assembly, and a valve intermediate said vapor return line and said vapor assembly.

11. In an installed tank system for volatile liquids and means for filling it, a normally fixed tank, a single unitary passage unit extending from said tank and having a plurality of apertures, removable closures for said apertures, a removable loading valve assembly, a removable vapor return valve assembly, and means for removably securing said assemblies in relation to movably securing in said passage unit while said apertures are closed, means for opening the closures of said apertures through said valve assemblies after they have been applied, a loading line and means for removably securing it to the loading valve assembly, a vapor return line and means for removably securing it to said vapor return valve assembly, valves for said loading and vapor return lines, and additional means for venting the interiors of said valve assemblies.

12. In an installed tank system for volatile liquids and means for filling it, a normally fixed tank, a single unitary passage unit extending from said tank and having a plurality of apertures, removable closures for said apertures, a removable loading valve assembly, a removable vapor return valve assembly, means for securing said assemblies in relation to said apertures in said passage unit while said apertures are closed, means for opening the closures of said apertures through said valve assemblies after they have been applied, a loading line and means for removably securing it to the loading valve assembly, a vapor return line and means for removably securing it to said vapor return valve assembly, valves for said loading and vapor return lines, and gauging means for gauging the depth of liquid in said tank, said gauging means extending downwardly through said single passage unit.

13. In an installed tank system for volatile liquids and means for filling it, a normally fixed tank, a single hollow passage unit in communication with the interior of and extending from said tank and having a plurality of apertures and being fully open to the interior of said tank, removable closures for said apertures, a removable loading valve assembly, a removable vapor return valve assembly, means for securing said assemblies in relation to said apertures in said passage unit while said apertures are closed, means for opening the closures of said apertures through said valve assemblies after they have been applied, a loading line and means for removably securing it to the loading valve assembly, a vapor return line and means for removably securing it to said vapor return valve assembly, valves for said loading and vapor return lines, and a gas supply line extending from said single passage unit to the point of use.

VIRGIL I. HOOPER.
LOUIS G. HOOPER.